United States Patent [19]
Previati

[11] 4,164,440
[45] Aug. 14, 1979

[54] DEVICE FOR VULCANIZING CONVEYOR BELTS AND SIMILAR ARTICLES

[75] Inventor: Augusto Previati, Milan, Italy

[73] Assignee: Industrie Pirelli, S.p.A., Milan, Italy

[21] Appl. No.: 851,379

[22] Filed: Nov. 14, 1977

[30] Foreign Application Priority Data

Dec. 13, 1976 [IT] Italy ............................... 30336 A/76

[51] Int. Cl.² ............................................. B30B 15/34
[52] U.S. Cl. ............................. 156/583.1; 428/539.5; 252/12.2
[58] Field of Search ................. 156/583; 264/236, 347

[56] References Cited

U.S. PATENT DOCUMENTS

| | | | |
|---|---|---|---|
| 3,032,454 | 5/1962 | Rohdin | 156/583 |
| 3,547,742 | 12/1970 | Cottrell | 156/583 |
| 3,956,058 | 5/1976 | Wemhoener | 156/583 |
| 3,993,426 | 11/1976 | Ahrweiler et al. | 156/583 |

*Primary Examiner*—Douglas J. Drummond
*Attorney, Agent, or Firm*—Stevens, Davis, Miller & Mosher

[57] ABSTRACT

A device for vulcanizing conveyor belts is disclosed consisting essentially of an improved flat platen press comprising two platens which are parallel to each other and superimposed, a plurality of frames, resting on carriages, each provided with a central aperture, the platens being inserted in the frame apertures, one of the platens being attached to the rim of the frame apertures and the other platen being supported by the pistons of cylinder/piston systems attached to the rim of the frame apertures, clamps for clamping, moving and tensioning the conveyor belt up-line and down-line of the platens, and two metal strips subtended by cylinders, one metal strip surrounding the upper platen in the longitudinal direction and the other metal strip surrounding the lower platen in the longitudinal direction, and means for heating each of the platens, and including means for substantially reducing the coefficient of sliding friction between each platen and the corresponding metal strip surrounding it.

8 Claims, 3 Drawing Figures

DEVICE FOR VULCANIZING CONVEYOR BELTS AND SIMILAR ARTICLES

This invention is an improvement over that described and claimed in Italian application No. 29 692 A/75, filed Nov. 27, 1975, corresponding to U.S. application Ser. No. 742,245, filed Nov. 16, 1976, the disclosure of which (for brevity) is to be regarded as incorporated herein by reference.

The prior application describes a process for vulcanizing conveyor belts and similar articles based on an elastomeric material compound, comprising the following stages:

(a) the conveyor belt is heated to the vulcanizing temperature of the elastomeric material compound of which it consists, and at the same time it is subjected to a pressure which is not less than the vapor pressure of the volatile components present in the said elastomeric material compound, so that the crude elastomeric material compound plasticizes without the formation of bubbles;

(b) still maintaining the conveyor belt at the vulcanizing temperature of the elastomeric material compound, the applied pressure is increased to a value between 6 and 10 kg/cm$^2$, so that the elastomeric material compound of the conveyor belt is molded at low pressure, without danger of altering the arrangement of the reinforcement inserts in the conveyor belt; and (c) while still maintaining the conveyor belt at the vulcanizing temperature, the applied pressure is reduced to a value which is not less than the vapor pressure of the volatile components present in the elastomeric material compound, which completes the vulcanization process of the elastomeric material comprising the conveyor belt.

The prior application also describes a device for carrying out the process described above. This device consists of an improved press with flat platens, having two hot platens which are superimposed and parallel to each other, a plurality of frames resting on sliding components, each frame having a central aperture. The hot platens are inserted in the apertures in the frames, one of the hot platens being attached to the rim of the apertures in the frames, and the other hot platen being supported by the pistons of the cylinder/piston systems attached to the rim of the apertures in the frames.

Clamps for clamping, moving and tensioning the conveyor belt are provided up-line and down-line of the hot platens. In addition, a metal strip is arranged round each hot platen, surrounding it in a longitudinal direction, the said metal strip being subtended by two cylinders, one up-line and one down-line of the hot platen.

The principal objective of the process and device of the prior application is to be able to vulcanize a conveyor belt with a high rate of production, and without defects being introduced into the conveyor belt during the vulcanizing process. A further objective is to provide a vulcanizing device in the form of a flat platen press which is both light, and therefore less expensive than the presses of the known type, and automatic, i.e. contrary to the known type of presses no manual intervention is required each time the press opens to remove the conveyor belt from the press platens.

The object of the present invention is to provide a device for vulcanizing conveyor belts according to the process which forms the subject of the prior application which is however even lighter, thus achieving the optimum minimum weight, and consequently, the optimum minimum cost of the device itself.

A further object of the present invention is to increase productivity of the vulcanizing device according to the prior application referred to above.

The present invention provides a device for vulcanizing conveyor belts, consisting of an improved flat platen press, having two hot platens which are superimposed and parallel to each other, a plurality of frames, resting on carriages, each having a central aperture, the hot platens being inserted in the frame apertures, one of the hot platens being attached to the rim of the frame apertures and the other hot platen being supported by the pistons of cylinder/piston systems attached to the rim of the frame apertures, clamps for clamping, moving and tensioning the conveyor belt being provided upstream and downstream of the hot platens, and two metal strips subtended by cylinders also being provided, one metal strip surrounding the upper hot platen in a longitudinal direction and the other metal strip surrounding the lower hot platen in a longitudinal direction, the whole arrangement being in general accordance with the prior application, but being further characterized by the fact that it includes means which reduce the sliding coefficient of friction between each hot platen and the corresponding metal strip which surrounds it.

This invention will be still more clearly understood from the following detailed description which is given merely by way of example and is therefore not limitative, and with reference to the accompanying drawings where:

Figure 1:
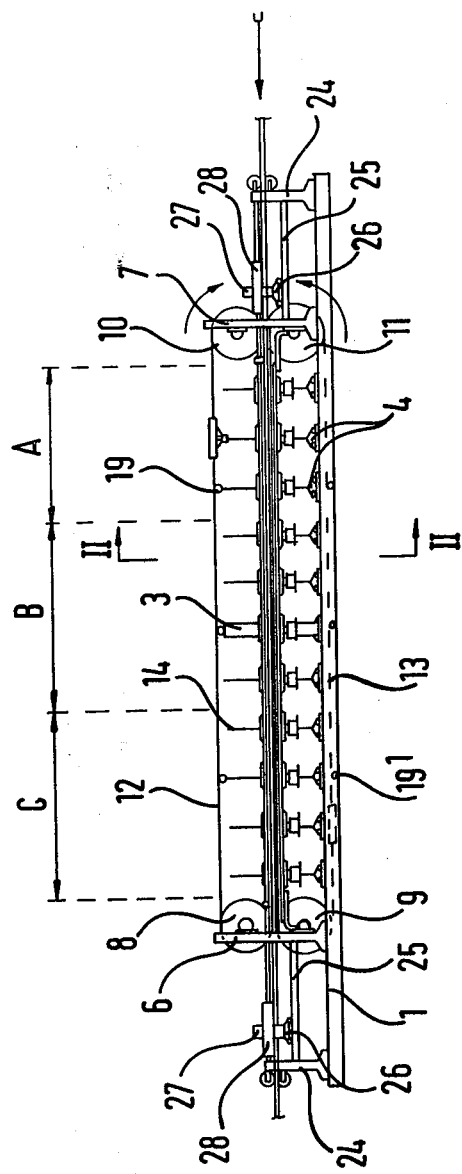
FIG. 1 shows a side view of a press according to the invention.
Figure 2:
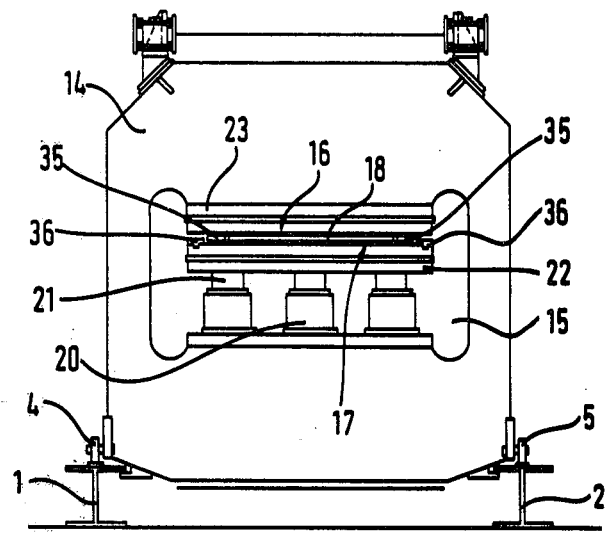
FIG. 2 shows an enlargement of the section of the press along line II—II in FIG. 1.

As can be seen in FIGS. 1 and 2, the flat platen press involved herein has a pair of rails 1 and 2, firmly anchored to the floor, carrying a fixed frame 3 constituting the center line of the press. On the rails 1, 2 rest a plurality of sliding components comprising carriages 4 and 5, for example, and fixed supports 6 and 7 which carry the pairs of idler rollers 8, 9 and 10, 11, respectively.

A continuous metal strip 12 extends between rollers 8 and 10 and a continuous metal strip 13 extend between rollers 9 and 11.

Carriages 4 rest on rail 1 and carriages 5 rest on rail 2.

There is an equal number of carriages 4 and 5 arranged in pairs. The series of carriage pairs 4 and 5 support plate frames 14 (see FIG. 2).

Frames 14 and 3 are provided with substantially rectangular apertures 15 in which are placed two hot platens 16 and 17 constituting the press platens. The two sections of metal strips 12 and 13 nearest each other pass between the two hot platens in order to contain conveyor belt 18 to be vulcanized while disposed between them. The upper section or run of metal strip 12 passes over frames 14 and 3, resting on rollers 19 attached to the said frames 14 and 3. The lower section or run of metal strip 13 passes underneath the plate frames, level with carriages 4 and 5 and resting on rollers 19'.

Each frame 14 has, at the bottom of its aperture 15 (see FIG. 2), a series of cylinders 20 (three are illustrated in FIG. 2), from which pistons 21 emerge, hydraulically operated, which are connected mechanically, in a pre-determined position, to hot platen 17, which is the lower press platen, by means of plates 22.

Hot platen 16, which is the upper press platen, is mechanically connected to the top of aperture 15 of each frame by means of plate 23.

Clamping systems for tensioning the conveyor belt to be vulcanized are present up-line and down-line of the press. The clamping systems up-line and down-line of the press are identical. As shown in FIG. 1, each clamping system consists of a frame formed by a pair of brackets 24 fixed to rails 1 and 2. Brackets 24 are inter-connected by a cross-piece which is not visible in FIG. 1, and each bracket is also connected to the nearest idler roller support by means of a bar 25. These bars act as rails for carriages 26 supporting clamp 27.

In addition, there is a pair of double acting cylinder/piston systems 28 disposed laterally with respect to each clamp which connects clamp 27 to brackets 24 and the idler roller supports.

These double acting cylinder/piston systems 28 are used to move the carriages on the bars or rails 25.

Figure 3:
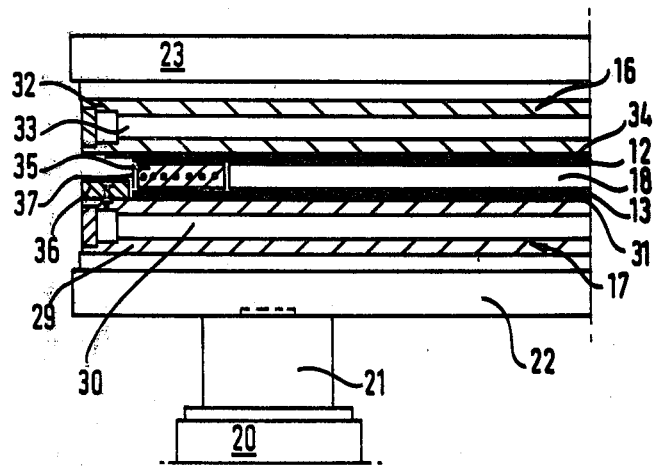
FIG. 3 shows an enlargement of a detail of FIG. 2.

The design details of the hot platens 16 and 17 are illustrated in FIG. 3. As shown in FIG. 3, hot platen 17 consists of a sheet 29 of metal which can be a continuous sheet or a number of sections mechanically connected end-to-end to form a continuous sheet. On the inside of sheet 29 there is a plurality of cavities 30 in which the hot fluid, such as saturated water vapor, for example, steam, is circulated.

On the surface of hot platen 17 facing towards the other hot platen 16, there is provided a layer 31 of a material having a low coefficient of friction attached thereto by per se known means. The following are amongst the numerous suitable materials having a low coefficient of friction that may be employed:

Sintered materials containing substances or mixtures of substances having a low coefficient of friction such as, for example: a layer of material sold by Associated Engineering (Italy) under the commercial name 'D U' and consisting of a layer of sintered spheroidal bronze impregnated with a mixture of polytetrafluoroethylene and lead powder;

Fabrics impregnated with substances or mixtures of substances having a low coefficient of friction such as, for example: a fabric of glass or metal fibers impregnated with polytetrafluoride;

Heat resistant oils, etc. such as, for example, silicone oils;

A sheet of an elastomeric material which may if desired be reinforced, and having its surface coated with a heat resistant oil or grease, e.g. a silicone grease.

According to another embodiment not shown, the layer 31 of material having a low coefficient of friction applied to hot platen 17 may be omitted and replaced by a layer having the same characteristics applied to the surface of the continuous metal strip 13 facing hot platen 17.

Hot platen 16 has the same construction as described above for hot platen 17, as can be clearly seen from FIG. 3. In effect, hot platen 16 consists of a sheet 32 of metal which may be a continuous sheet or it may be made up of a number of sections mechanically connected end-to-end to form a continuous strip.

On the inside of sheet 32 there is a number of cavities 33 in which the hot fluid, such as saturated water vapor, for example steam, is circulated.

On the surface of hot platen 16 facing the other hot platen 17 there is a layer 34 having the same composition as that of layer 31 previously described, which is attached using per se known means.

The sections of metal strips 12 and 13 which are nearest to each other pass through the space between hot platens 16 and 17.

In the space between the hot platens, i.e. on the longitudinal edges of the said hot platens and between the edges of the metal strips, there is a component to contain the conveyor belt which may be provided with means—e.g. per se conventional guide wheels or linear guide (not illustrated)—to maintain it in the desired pre-determined position between the press platens.

This retaining component preferably consists of two straight edges 35, one for each longitudinal edge of the hot platens, the thickness of which is different from that of the conveyor belt 18 to be vulcanized, in order to allow for any variations in volume of the conveyor belt through the effects fo temperature, and any need to compact the material of the belt, the thickness being determined according to the desired dimensions of the conveyor belt 18 to be vulcanized.

The difference in thickness between the conveyor belt to be vulcanized and that of the straight edge cannot be defined as an absolute value as it depends on the nature of the elastomeric material of which the conveyor belt consists, and on the reinforcement inserts contained in the conveyor belt.

These straight edges can be flexible in that they may consist of strips (if desired joined together to make a ring-like structure) of flexible material, e.g. entirely of elastomeric material or reinforced elastomeric material, and may follow the annular path of one of the metal strips, or they may be attached to the edges of one of the two metal strips, or they may be articulated, in that they may consist of a plurality of rigid metal segments hinged together and, if desired, joined to form a ring-like structure in this case too.

In addition, at the initial zone of the press, which is up-line in relation to the direction of movement of the belt, i.e., the right side of the device as shown in FIG. 1, suitable feed devices, such as roller guides or sliding guides for example (not illustrated), are provided, which position the straight edges exactly as desired in relation to the press platens and define exactly the width of the space between the press platens to be occupied by the conveyor belt 18 to be treated.

In addition, at the side edges of hot platen 17 metal rules 36 are attached, the purpose of which is to contain or confine the flexible straight edges 35 which tend to move away from the hot platens with the action of the conveyor belt during the whole of the vulcanizing process.

In addition, between each flexible straight edge 35 and the corresponding retaining rule 36, a small metal strip 37 may be inserted, the height of which is equal to that of the flexible straight edge 35, and the function of which is to reduce the friction between these components. On the surface of metal strip 37 in contact with rule 36 a layer (not illustrated) having the same characteristics as those of layer 31 previously described may be provided. In addition, metal strips 37 may be joined together so that they too form a ring-like structure and extend around rollers (not illustrated) located up-line and down-line of the press. An alternative to endless strips 37 is an open strip which unwinds from a coil located up-line of the press and winds on to a coil down-line of the press during operation thereof.

The previous description of the press according to this invention does not indicate the devices which coordinate the movements of the various press mechanisms, i.e. coordinate the cylinder/piston movements and the movements of the clamps up-line and downline of the press. These devices for coordinating the movements of the various press mechanisms comprise either electric circuits or pneumatic or mechanical systems, etc. and any engineer in this field who knows the method of operation of the press according to the invention which is described below, will be in a position to arrange them appropriately with no difficulty.

The press operates as follows: The conveyor belt 18 to be treated advances with a discontinuous movement, i.e., intermittently in a series of steps of equal length, between the press platens, and these steps will now be described.

As shown in FIG. 1, the press can be ideally divided into three treatment zones of different lengths, marked A, B and C respectively.

Zone A of the press is where the pre-heating phase of the process according to the prior application is carried out, and the cylinders with pistons belonging to the press in that section apply a constant pressure of between 1–2 kg/cm$^2$ to the part of the conveyor belt present between the hot platens in that zone.

Zone B of the press is where the shaping phase of the process according to the prior application takes place, and the cylinders with pistons belonging to the press in that section apply a constant pressure of between 6–10 kg/cm$^2$ to the part of the conveyor belt present between the hot platens in that zone.

Zone C of the press is where the final vulcanizing stage according to the prior application takes place, and the cylinders with pistons belonging to the press in that section apply a constant pressure of between 1–2 kg/cm$^2$ to the part of the conveyor belt present between the hot platens in that zone.

Although hot platens 16 and 17 are continuous it is possible to apply different pressures at different positions on the hot platens because the hot platens are flexible, consisting of metal sheets, i.e. parts which are very long in relation to their thickness.

The lengths of zones A, B and C described above are different, and their lengths depend on the amount of time required by the press to carry out the three stages of the process according to this invention.

So that each point of the conveyor belt may be subjected to the same treatment, the length by which the conveyor belt advances between the press platens must not exceed the greatest common divisor of the lengths of sections A, B and C into which the press is ideally divided.

In addition, the time during which the hot platens apply the pressure distribution determined by the process to the part of the conveyor belt present between them must not exceed the greatest common divisor of the time required to carry out the three stages of the process.

Once this time has elapsed, the pressure in zone B of the press is reduced, i.e. reduced from 6–10 kg/cm$^2$ to the 1–2 kg/cm$^2$ pressure which exists in zones A and C of the press.

This result is obtained by reducing the pressure of the cylinders with piston which are present in zone B of the press.

At this point, movement of the clamping systems intervenes which feeds the conveyor belt between the hot platens of the press in the direction of the arrow in FIG. 1, there being two embodiments of operation.

In the first embodiment of operation, which applies in the case where the conveyor belts to be vulcanized contain a reinforcement structure which is extensible with the action of heat, before the conveyor belt is moved forward, i.e. when a pressure of between 6–10 kg/cm$^2$ is being applied in zone B, the clamps hold the conveyor belt up-line and down-line of the press and maintain it under tension. Initially, the clamp up-line of the press is away from support 7 of rollers 10 and 11, and the clamp down-line of the press is near support 6 of rollers 8 and 9.

In addition, the pressure in double action cylinders 28 of both clamping systems up-line and down-line of the press is the same. As the pressure applied by the hot platens to the section of the conveyor belt contained between them is uniform at 1–2 kg/cm$^2$, the pressure in the double action cylinders of the clamping system down-line of the press is increased, whereas the pressure in the double action cylinders of the clamping system up-line of the press remains constant.

The result is that the clamp down-line of the press moves away from support 6 of rollers 8 and 9, and the clamp up-line of the press moves towards support 7 of rollers 10 and 11 (see FIG. 1), and during this movement, the part of the belt contained between the clamping systems is under tension. In addition, during movement of the clamps, metal strips 12 and 13 and straight edges 35 and strips 37 move, accompanying the movement of the conveyor belt, by sliding between the hot platens, due to the low friction between these and the components mentioned.

When the clamping system down-line of the press has moved by an amount which does not exceed the greatest common divisor of the lengths of zones A, B and C previously defined—its movement entraining the clamping system up-line and the conveyor belt contained between the said clamping systems—the pressure of the cylinders with piston present in section B of the press is increased so that the hot platens in section B of the press are able to apply a pressure of 6–10 kg/cm$^2$ to the belt.

At this point, the clamps up-line and down-line of the press open and double action cylinders 28 return them quickly to the starting position. The clamps up-line and down-line of the press close again and the same pressure which places the section of belt contained between the clamps under tension is introduced into double action cylinders 28.

In the second embodiment of operation which applies in the case where the conveyor belts to be vulcanized contain a reinforcement structure which is substantially inextensible with the effect of heat, besides the first method of operation previously described, the following method may also be used:

First of all, the clamp up-line of the press is always open. Starting from the situation where a pressure of 6–10 kg/cm$^2$ is being applied to the part of the conveyor belt in zone B of the press, in this situation the clamp down-line of the press is near the press and holds the belt without subjecting it to tension.

As the pressure in zone B of the press is reduced to between 1–2 kg/cm$^2$, at the same time the pressurized fluid is introduced into cylinders 28 of the clap downline of the press, and therefore this clamp moves away from the press, entraining the belt for a length which does not exceed the greatest common divisor of the lengths of sections A, B and C into which the press is ideally divided.

It will be easily understood from the previous description that the objects of this invention are achieved in the manner described.

In effect, the actual press consist of only two thin sheets supported by plate frames, and therefore the structure of the press is reduced to the essential components only. The result is that the weight of the press, and its cost, represent optimum minimum values. The expression "optimum minimum value" used for the weight and cost of the press does not mean minimum weight and cost, but means minimum weight and cost in relation to the length of the hot platens.

In addition, a press according to this invention insures a high rate of productivity and this advantage can be easily understood if one considers that, basically, all "dead times" connected with the feeding of the conveyor belt through the press, i.e. all times not required by the actual vulcanization reaction, are eliminated.

Although only a specific embodiment of this invention has been illustrated and described, it is understood that its scope includes all possible variations available to the skilled engineer in this field, and in particular the variation where the metal strips surrounding the hot platens also pass inside at least the clamp down-line of the press in order to reduce stresses on the conveyor belt to be vulcanized when the reinforcement structure of the conveyor belt makes it necessary.

What is claimed is:

1. In a device for vulcanizing conveyor belts consisting essentially of an improved flat platen press comprising two platens which are parallel to each other and superimposed, a plurality of frames, resting on carriages, each provided with a central aperture, the platens being inserted in the frame apertures, one of the platens being attached to the rim of the frame apertures and the other platen being supported by the pistons of cylinder/piston systems attached to the rim of the frame apertures, clamps for clamping, moving and tensioning the conveyor belt up-line and down-line of the platens, and two metal strips subtended by cylinders, one metal strip surrounding the upper platen in the longitudinal direction and the other metal strip surrounding the lower platen in the longitudinal direction, means for heating each of the platens and means for substantially reducing the coefficient of sliding friction between each platen and the corresponding metal strip surrounding it, the improvement consisting in that the means for substantially reducing the coefficient of sliding friction comprises a layer of sintered metallic material impregnated with a substance having a low coefficient of friction disposed between each platen and the metal strip surrounding it.

2. A device according to claim 1 wherein the layer of sintered material is a layer of sintered spheroidal bronze.

3. A device according to claim 1 wherein the substance having a low coefficient of friction, impregnating the sintered layer is a mixture of polytetrafluorethylene and lead powder.

4. A device according to claim 1 wherein the substance having a low coefficient of friction, impregnating the sintered layer is a heat resistant grease.

5. A device according to claim 1 including further a straight edge in the space between the platens and arranged between the two metal strips on each of the two longitudinal edges of the platens, this straight edge being flexible and movable.

6. A device according to claim 1 including further a retaining rule attached to the longitudinal edges of the lower platen.

7. A device according to claim 6 wherein a small metal strip is inserted between each straight edge and the retaining rule.

8. A device according to claim 7 wherein the retaining rule is provided with a layer of material having a low coefficient of friction on the surface thereof intended to come into contact with the metal strip.

* * * * *